US012513036B2

(12) United States Patent
Liu et al.

(10) Patent No.: US 12,513,036 B2
(45) Date of Patent: Dec. 30, 2025

(54) TRANSMITTER AND RECEIVER FOR AND METHOD OF TRANSMITTING AND RECEIVING SYMBOLS OVER AN ORTHOGONAL TIME FREQUENCY SPACE COMMUNICATION CHANNEL SUBJECT TO DOPPLER SPREAD AND MULTIPATH

(71) Applicants: Continental Automotive Technologies Gmbh, Hannover (DE); Nanyang Technological University, Singapore (SG)

(72) Inventors: Yujie Liu, Singapore (SG); Yong Liang Guan, Singapore (SG); David Gonzalez Gonzalez, Frankfurt am Main (DE)

(73) Assignees: CONTINENTAL AUTOMOTIVE TECHNOLOGIES GMBH, Hannover (DE); NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 18/564,286

(22) PCT Filed: May 24, 2022

(86) PCT No.: PCT/EP2022/064001
§ 371 (c)(1),
(2) Date: Nov. 27, 2023

(87) PCT Pub. No.: WO2022/248446
PCT Pub. Date: Dec. 1, 2022

(65) Prior Publication Data
US 2024/0250858 A1    Jul. 25, 2024

(30) Foreign Application Priority Data

May 28, 2021 (DE) .................... 10 2021 205 468.4
Oct. 11, 2021 (DE) .................... 10 2021 126 321.2

(51) Int. Cl.
H04L 27/26 (2006.01)
H04L 25/02 (2006.01)
H04W 52/32 (2009.01)

(52) U.S. Cl.
CPC ...... *H04L 27/2639* (2013.01); *H04L 25/0222* (2013.01); *H04L 27/26134* (2021.01); *H04W 52/325* (2013.01)

(58) Field of Classification Search
CPC ............ H04L 27/2639; H04L 25/0222; H04L 27/26134; H04L 27/2613; H04L 27/2605; H04L 27/2628; H04W 52/325
(Continued)

(56) References Cited

U.S. PATENT DOCUMENTS 11,632,276 B2 * 4/2023 Pfadler ............... H04L 27/2639
                                                               375/260
2017/0230215 A1 * 8/2017 Rakib ............... H04L 27/26538
(Continued)

FOREIGN PATENT DOCUMENTS

WO    2021001278 A1    1/2021

OTHER PUBLICATIONS

Liu et al., "Near-Optimal BEM OTFS Receiver With Low Pilot Overhead for High-Mobility Communications", IEEE Transactions on Communications, vol. 70, No. 5, May 1, 2022, pp. 3392-3406.
Shen et al., "Channel Estimation for Orthogonal Time Frequency Space (OTFS) Massive MIMO", IEEE Transactions on Signal Processing, vol. 67, No. 16, Aug. 15, 2019, pp. 4204-4217.
(Continued)

*Primary Examiner* — Emmanuel Bayard
(74) *Attorney, Agent, or Firm* — Buchanan Ingersoll & Rooney PC (57) ABSTRACT

Pilot symbols and data symbols of a communication frame for an OTFS transmission system are two-dimensionally arranged along the points of a grid in the delay-Doppler domain. The pilot symbols are surrounded by guard symbols. The number of guard symbols in each direction of the
(Continued)

Doppler domain is twice the number of the basis expansion modelling (BEM) basis functions used for modelling the communication channel in a receiver, and twice the maximum time delay in terms of delay bins in each direction of the delay domain. The receiver performs an initial pilot-aided channel estimation using BEM of a first BEM order and using the pilot signals, followed by an initial estimation of data symbols using the initial channel estimation, and iteratively performs data aided channel estimation using BEM of a second BEM order and at least the received data signals, until a termination criterion is met.

20 Claims, 4 Drawing Sheets

(58) Field of Classification Search
USPC .................................. 375/260, 267, 299, 347
See application file for complete search history.

(56) References Cited

U.S. PATENT DOCUMENTS

| | | | |
|---|---|---|---|
| 2018/0227159 A1* | 8/2018 | Rakib | H04L 27/2646 |
| 2020/0389268 A1* | 12/2020 | Sathyanarayan | H04L 27/26532 |
| 2021/0105155 A1* | 4/2021 | Kons | H04L 25/0248 |
| 2021/0111842 A1* | 4/2021 | Pfadler | H04L 27/2602 |
| 2021/0112527 A1* | 4/2021 | Pfadler | H04W 72/04 |
| 2022/0417062 A1* | 12/2022 | Pfadler | H04L 5/0051 |

OTHER PUBLICATIONS

Zhao et al., "Pilot Optimization for OFDM-Based OTFS Systems Over Doubly Selective Channels", Globecom 2020—2020 IEEE Global Communications Conference, IEEE, Dec. 7, 2020, 6 pages.
International Search Report and Written Opinion for International Application No. PCT/EP2022/064001, dated Sep. 23, 2022, 14 pages.

* cited by examiner

TRANSMITTER AND RECEIVER FOR AND METHOD OF TRANSMITTING AND RECEIVING SYMBOLS OVER AN ORTHOGONAL TIME FREQUENCY SPACE COMMUNICATION CHANNEL SUBJECT TO DOPPLER SPREAD AND MULTIPATH

CROSS REFERENCE TO RELATED APPLICATIONS

This application is the U.S. National Phase Application of PCT International Application No. PCT/EP2022/064001, filed May 24, 2022, which claims priority to German Patent Application No. 10 2021 126 321.2, filed Oct. 11, 2021 and German Patent Application No. 10 2021 205 468.4, filed May 28, 2021, the contents of such applications being incorporated by reference herein.

FIELD OF THE INVENTION

The present invention relates to a method of transmitting and receiving symbols over an orthogonal time frequency space (OTFS) communication channel subject to Doppler spread and a transmitter and a receiver implementing the method.

BACKGROUND OF THE INVENTION

The sixth generation (6G) wireless communications and beyond are expected to serve a large number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalizers. However, due to speed-dependent Doppler shifts or spreads and quickly varying multipath reception high-mobility communications suffer from severe time and frequency dispersiveness. Time and frequency dispersiveness each cause signal fading at the receiver, and the fading is thus also referred to as doubly selective channel fading.

Doubly selective channel fading significantly impairs the performance of OFDM communication.

As an alternative to OFDM, OTFS modulation was proposed as a solution for coping with doubly selective fading channels.

OTFS modulation is a 2D modulation scheme that multiplexes information QAM symbols over carrier waveforms that correspond to localized pulses in a signal representation that is referred to as delay-Doppler representation. The OFTS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission.

The OTFS waveforms couple with the wireless channel in a way that directly captures the underlying physics, yielding a high-resolution delay-Doppler Radar image of the constituent reflectors. As a result, the time-frequency selective channel is converted into an invariant, separable and orthogonal interaction, where all received symbols experience the same localized impairment and all the delay-Doppler diversity branches are coherently combined.

This renders OFTS ideally suited for wireless communication between transmitters and receivers that move at high speeds with respect to each other, e.g., receivers or transmitters located in high-speed trains, cars and even aircrafts.

However, OFTS presents its own challenges when it comes to channel estimation and equalization in a receiver, and using adapted conventional OFDM receiver designs does not provide the required performance, requires significant pilot overhead of up to 50%, or provides acceptable performance only under ideal conditions, which are unrealistic in practice.

SUMMARY OF THE INVENTION

Aspects of the present invention include proposing a transmitter and a receiver, respectively, for an OTFS transmission system, and corresponding methods for transmitting and receiving, respectively, binary data sequences over an OTFS communication channel, which permit using an improved communication frame design for an OTFS transmission system having a reduced pilot overhead while providing near-optimal performance from transmission to decoding.

The various aspects of the present invention rely on a novel model representing an OFTS channel, which will be introduced prior to discussing the application thereof in a transmitter and/or a receiver and the respective methods for transmitting and receiving.

Figure 1:
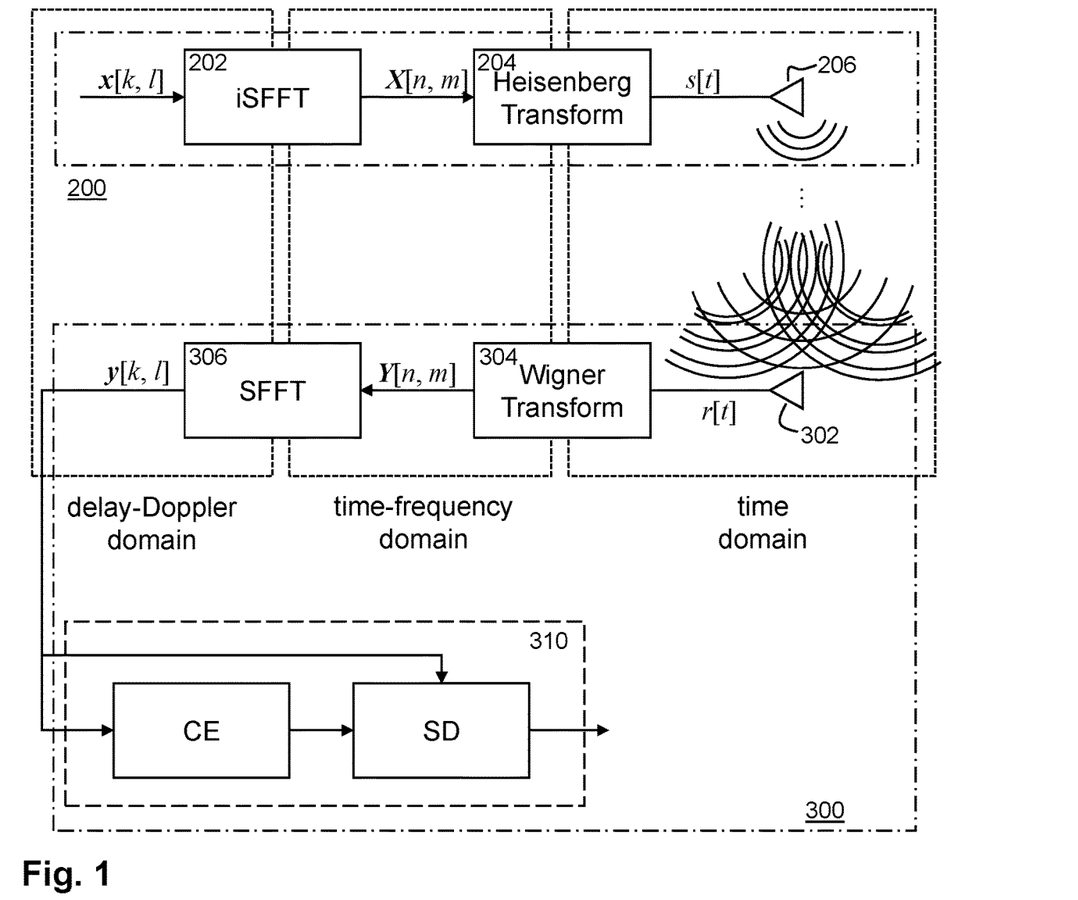
FIG. 1 shows a block diagram of a general OTFS transmission system.

FIG. 1 shows a block diagram of a general OFTS transmission system. A transmitter 200 comprises a first transmitter-side transformation unit 202 and a second transmitter-side transformation unit 204. Serial binary data is input to a signal mapper (not shown in the figure) that outputs a two-dimensional sequence of information symbols x[k, l] in which the QAM symbols are arranged along the delay period and the Doppler period of the delay-Doppler domain. The information symbols comprise data symbols, pilot symbols and guard symbols surrounding the pilot symbols. The two-dimensional sequence of information symbols x[k, l] is input to the first transmitter-side transformation unit 202 and is subjected to an inverse Finite Symplectic Fourier Transformation (ISFFT), which produces a matrix X[n, m] that represents the two-dimensional sequence of information symbols x[k, l] in the time-frequency domain. As the transmitter transmits in the time domain, a further transformation in the second transmitter-side transformation unit 204 is required, which produces the signal s[t] in the time domain, e.g., a Heisenberg transformation. The signal s[t] is then transmitted via an antenna 206 over the communication channel.

In a realistic environment the transmitted signal, on its way from the transmitter through the communication channel to the receiver, is subject to doubly selective fading with Doppler spread. The received signal is a superposition of a direct copy and a plurality of reflected copies of the transmitted signal, where each copy is delayed by a path delay that is dependent from the length of the signal's path delay and is frequency shifted by the Doppler shift that depends from the differential speed between transmitter and receiver. Each of the signal copies is weighted in accordance with its particular path delay and differential speed. Typical Doppler shifts are on the order of 10 Hz-1 kHz, though larger values may occur in scenarios with extremely high mobility (e.g., high-speed trains) and/or high carrier frequency. As in realistic environments it is very likely that multiple reflectors are present, the received superimposed signal is spread out over a frequency range rather than merely shifted in frequency, and the signal deformation is thus also referred to as Doppler spread. In the following description the realistic communication channel is also referred to as practical communication channel.

In FIG. 1 the practical communication channel is represented by the undisturbed radio waves emitted from the transmitter antenna 206 and the various unordered radio waves coming from different directions and with different distances to each other at the receiver antenna 302.

The receiver 300 picks up the received signal r[t] in the time domain, which is provided to a first receiver-side transformation unit 304, in which it is subjected to a Wigner transform for transforming the received signal r[t] into a matrix Y[n, m] representing the received signal r[t] in the time-frequency domain. For enabling signal detection in the delay-Doppler domain the matrix Y[n, m] is then provided to a second receiver-side transformation unit 306, where it is subjected to a Finite Symplectic Fourier Transformation (SFFT), which outputs a two-dimensional sequence of information symbols y[k, l] in the delay-Doppler domain. The two-dimensional sequence of information symbols y[k, l] is input to a channel estimation and equalization block 310, which performs channel estimation CE and signal detection SD and reconstructs the symbols that were originally transmitted, and ultimately to a de-mapper that outputs the binary data that was originally transmitted (de-mapper not shown in the figure).

In the following it is assumed that a rectangular windowing waveform is used. N and M represent the dimensions of the delay grid and the Doppler grid, respectively, in which the symbols are arranged. The transmitted complex OTFS matrix x is defined as $$x = [x[0, 0], x[0, 1], \ldots, x[0, M-1], \ldots, x[N-1, 0], x[N-1, 1], \ldots ,$$
$$x[N-1, M-1]]^T$$

and the received OTFS matrix y is defined as $$y = [y[0, 0], y[0, 1], \ldots, y[0, M-1], \ldots, y[N-1, 0], y[N-1, 1], \ldots ,$$
$$y[N-1, M-1]]^T$$

in the delay-Doppler domain.

After propagating through the doubly-selective fading channel with Doppler spread, the received signal vector y in the delay-Doppler domain could be written as $$y = (F_N \otimes I_M) H_t (F_N^H \otimes I_M) x + w,$$

where $F_N$ is the discrete Fourier transform (DFT) matrix, $I_M$ M×M identity matrix, w the additive white Gaussian noise (AWGN) vector, and $H_t$ the MN×MN time varying channel matrix in the time domain defined as, with h [t, l'] denoting the channel gain of l'-th path at t-th time instant and L denotes the channel length. Define $$f_{max} = \frac{f_c v}{c}$$

c as the maximum Doppler frequency, where $f_c$ is the carrier frequency, v the vehicle speed, and c the speed of light. Considering Jakes' model, the correlation function of l-th path is defined as $J_0(2\pi n f_{max} T_s)$, where $J_0(\cdot)$ denotes the zeroth-order Bessel function of the first kind, and $T_s$ the sampling period.

The use of the delay-Doppler channel representation is beneficial due to its compactness and sparsity. Since typically there is only a small number of physical reflectors with associated reflected signals, far fewer parameters are needed for channel modelling and estimation in the delay-Doppler domain than in the time-frequency domain.

An aspect of the present invention builds on the properties of the delay-Doppler channel representation and applies a basis expansion model (BEM) for parameterizing the time varying channel as a weighted combination of a number of basis functions in OFTS. BEM has numerous kinds, including complex exponential BEM (CE-BEM), generalized CE-BEM (GCE-BEM), non-critically sampled CE-BEM (NCS-CE-BEM), polynomial BEM, discrete prolate spheroidal (DPS) BEM, Karhunen-Loeve BEM (KL-BEM), spatial-temporal BEM, etc. KL-BEM with the knowledge of channel statistics is the most accurate BEM model. However, its performance is suboptimal when the assumed channel statistics differs from the real case. In contrast, CE-BEM and its variants GCE-BEM and NCS-CE-BEM are independent on the channel statistics.

In the following description GCE-BEM is selected due to its analytical tractability. Using GCE-BEM for constructing a channel model for use in the receiver, the l'-th (l'=0, 1, . . . , L) channel path at t-th (t=0, 1, . . . , MN−1) time instant in the time-varying channel matrix in the time domain can be modelled as $$h[t, l'] = \sum_{q=0}^{Q} c_q[l'] e^{j\omega_q t},$$

where Q denotes the order of BEM basis functions, $c_q[l']$ the q-th BEM coefficient of l'-th $$\omega_q = \frac{2\pi}{MNT}\left(q - \left\lceil\frac{Q}{2}\right\rceil\right)$$

the q-th BEM modeling frequency. Note that T is a positive integer. It is noteworthy that GCE-BEM with T≥2 is capable of minimizing the modelling error, while at the expense of high complexity, in comparison to GCE-BEM with T=1. To $$H_t = \begin{bmatrix} h[0,0] & 0 & \ldots & 0 & h[0,L] & h[0,L-1] & \ldots & h[0,1] \\ h[1,1] & h[1,0] & 0 & \ldots & 0 & h[1,L] & \ldots & h[1,2] \\ \vdots & \ddots & \ddots & \ddots & \ddots & \ddots & \ddots & \vdots \\ h[L,L] & h[L,L-1] & \ldots & h[L,1] & h[L,0] & 0 & \ldots & 0 \\ \vdots & \ddots & \ddots & \ddots & \ddots & \ddots & \ddots & \vdots \\ 0 & \ldots & 0 & h[MN-1,L] & h[MN-1,L-1] & \ldots & h[MN-1,1] & h[MN-1,0] \end{bmatrix},$$

accurately model the time varying channel, Q is taken as $Q=2\lceil TNf_{max}/\Delta f\rceil$, where $\Delta f$ is the subcarrier spacing. Therefore, $H_t$, i.e., the time-varying channel matrix in the time domain, can be further expressed as $$H_t = \sum_{q=0}^{Q} \mathrm{diag}\{b_q\}C_q,$$

where $b_q=[1, e^{j\omega_q}, \ldots, e^{j\omega_q(MN-1)}]$ denotes the q-th BEM basis function, and $c_q$ as circulant matrix is given by $$C_q = \begin{bmatrix} c_q[0] & 0 & \ldots & 0 & c_q[L] & c_q[L-1] & \ldots & c_q[1] \\ c_q[1] & c_q[0] & 0 & \ldots & 0 & c_q[L] & \ldots & c_q[2] \\ \vdots & \ddots & \ddots & \ddots & \ddots & \ddots & \ddots & \vdots \\ c_q[L] & c_q[L-1] & \ldots & c_q[1] & c_q[0] & 0 & \ldots & 0 \\ \vdots & \ddots & \ddots & \ddots & \ddots & \ddots & \ddots & \vdots \\ 0 & \ldots & 0 & c_q[L] & c_q[L-1] & \ldots & c_q[1] & c_q[0] \end{bmatrix}.$$

By exploiting the discrete Fourier transformation (DFT) concept, the circulant matrix $C_q$ can be expressed by $$C_q = F_{MN}^H \mathrm{diag}\{F_{MN\times L}c_q\}F_{MN}$$

where $c_q=[c_q[0], c_q[1], \ldots, c_q[L]]^T$ denotes the q-th BEM coefficient vector, $F_{MN}$ the MN-point DFT matrix, and $F_{MN\times L}$ corresponds to the first (L+1) columns of $F_{MN}$. Hence, $H_t$ could be further formulated as $$H_t = \sum_{q=0}^{Q} \mathrm{diag}\{b_q\}F_{MN}^H \mathrm{diag}\{F_{MN\times L}c_q\}F_{MN}.$$

Substituting the BEM-based representation of the channel Matrix $H_t$ in the equation describing the received signal vector y in the delay-Doppler domain yields $$y = \sum_{q=0}^{Q} (F_N \otimes I_M)\mathrm{diag}\{b_q\}F_{MN}^H \mathrm{diag}\{F_{MN\times L}c_q\}F_{MN}(F_N^H \otimes I_M)x + w$$

The element-wise input-output relation between x[k, l] and y[k, l] is derived in the following by considering GCE-BEM with T=1 for simplicity.

At the transmitter, after inverse SFFT, the symbols in the time and frequency domain X[n, m] is given by $$X[n, m] = \frac{1}{\sqrt{NM}} \sum_{k'=0}^{N-1}\sum_{l=0}^{M-1} x[k', l]e^{j2\pi\left(\frac{nk'}{N}-\frac{ml}{M}\right)}.$$

The time-domain symbols s[n,m'] after Heisenberg transform is written as $$s[n, m'] = \frac{1}{\sqrt{M}} \sum_{m=0}^{M-1} X[n, m]e^{j2\pi\frac{mm'}{M}}$$

$$= \sum_{m=0}^{M-1}\sum_{k'=0}^{N-1}\sum_{l=0}^{M-1} x[k', l]e^{j2\pi\left(\frac{nk'}{N}-\frac{ml}{M}\right)}e^{j2\pi\frac{mm'}{M}}.$$

$$= \sum_{k'=0}^{N-1} x[k', m']e^{j2\pi\frac{nk'}{N}}$$

After propagating through doubly selective fading channel, the received time-domain symbols r[n, l] is formulated as $$r[n, l] = \sum_{q=0}^{Q}\sum_{l'=0}^{L} h[nM + l, l']s[n, l - l']$$

$$= \sum_{q=0}^{Q}\sum_{l'=0}^{L}\sum_{k'=0}^{N-1} c_q[l']x[k', l - l']e^{j2\pi q'\frac{nM+l}{MN}}e^{j2\pi\frac{nk'}{N}}$$

where $q' = q - \left\lceil \frac{Q}{2} \right\rceil$ and l≥L are assumed. At receiver, after SFFT and Wigner transform, the received symbols in the delay-Doppler domain y[k, l] is given by $$y[k, l] = \sum_{n=0}^{N-1} r[n, l]e^{j2\pi\frac{-nk}{N}}$$

$$= \sum_{q=0}^{Q}\sum_{l'=0}^{L}\sum_{k'=0}^{N-1}\sum_{n=0}^{N-1} c_q[l']x[k', l - l']e^{j2\pi q'\frac{nM+l}{MN}}e^{j2\pi\frac{nk'}{N}}e^{j2\pi\frac{-nk}{N}}$$

$$= \sum_{q=0}^{Q}\sum_{l'=0}^{L} c_q[l']x[k - q', l - l']e^{j2\pi\frac{q'l}{MN}}.$$

Hence, the task of having to estimate $H_t$ in the receiver is transformed into the task of having to estimate the BEM coefficients $c_q[l']$. Thanks to modelling the communication channel using GCE-BEM, the number of unknown time varying channel coefficients that need to be determined at the receiver has been reduced from MN(L+1) to (Q+1)(L+1).

The effectiveness of using GCE-BEM channel modelling for channel estimation in the receiver will be described in the following with a focus on the channel modelling error in an exemplary practical 5G TDL-B channel with v=125 km/h and v=500 km/h.

The channel modelling error is defined as $$MSE_{Model} = \frac{\mathbb{E}\{(H_{BEM} - H_t)^2\}}{MN(L+1)},$$

with $H_{BEM}$ as the channel characterized by GCE-BEM. The numbers of delay and Doppler grids are set to M=128 and N=16, respectively. The carrier frequency and subcarrier spacing are respectively specified as 4 GHz and 15 KHz. Therefore, the minimum required value of Q for v=125 km/h is calculated as 2 and 4 for T=1 and T=2, respectively, while that for v=500 km/h are given by 4 and 8.

A number of observations can be made from the simulation results shown in table I:

TABLE I

| GCE-BEM channel modelling error $MSE_{Model}$ in OTFS. | | | | |
|---|---|---|---|---|
| BEM | v = 125 km/h | | v = 500 km/h | |
| order Q | T = 1 | T = 2 | T = 1 | T = 2 |
| 2 | 0.05 | 5.6e−4 | 0.3 | 0.32 |
| 4 | 0.03 | 9.48e−6 | 0.04 | 0.06 |
| 6 | 0.02 | 2.05e−7 | 0.02 | 9.5e−4 |
| 8 | 0.02 | 1.03e−8 | 0.02 | 2.87e−7 |

First, we can observe that the BEM modelling error can be reduced by increasing the BEM order Q. For example, given v=500 km/h and T=1, the BEM modelling error decreases from 0.3 to 0.02 as Q changes from 2 to 8. However, it is easily noticed that the modelling error for T=1 is big, and cannot further decrease by increasing only Q. To address this error floor, a more accurate GCE-BEM model with T=2 is proposed. According to Table I, the BEM modelling error is reduced significantly by increasing T from 1 to 2, especially when v=125 km/h. For instance, the BEM modelling error is lessened nearly 106 times when Q is 8. Note that at v=500 km/h, the BEM modelling error with T=2 is slightly bigger than that of T=1, when Q is 2 and 4. This is because these two values of Q are much smaller than its minimum required value of Q, and their performances cannot be guaranteed. When Q increases to 6 and 8, the smaller BEM modelling error can be achieved for T=2. Hence, the choices of Q and T are two important factors for GCE-BEM to accurately characterize the doubly selective fading channel with Doppler spread.

Figure 2:
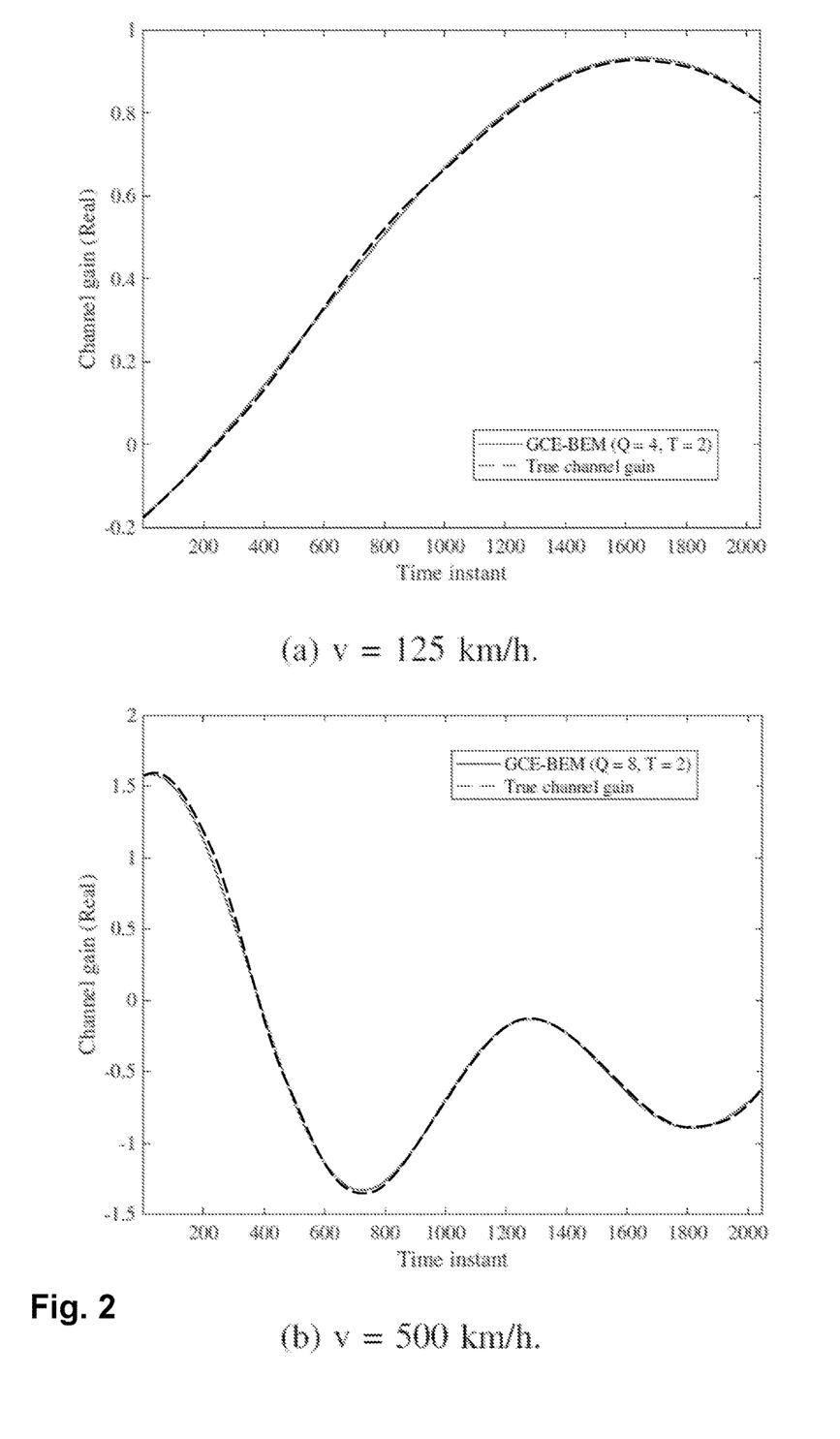
FIG. 2 shows the real part of channel gains of an exemplary practical 5G TDL-B OTFS channel at different speeds.

FIG. 2 shows the channel gain of an exemplary practical 5G TDL-B OTFS channel with Doppler spread as seen at a receiver over time, and the channel estimation in the receiver based on GCE-BEM with T=2 for a) v=125 km/h and b) v=500 km/h, respectively.

The minimum Q for v=125 km/h and v=500 km/h is chosen as 4 and 8, respectively. Two observations can be made from FIG. 2. On the one hand, the channel changes faster as the velocity increases. On the other hand, the proposed GCE-BEM model with T=2 matches closely with the true channel for both high (v=125 km/h) and extreme (v=500 km/h) mobility. For clarity, in the figure the difference between the true channel gain represented by the dashed line and the estimated channel gain shown by the solid line is shown exaggerated over the actual results, which match almost indistinguishably.

One takeaway from the example above is that using a two-stage channel estimation in the receiver appears advantageous. As will be described further below, the receiver according to an aspect of the invention uses such two-stage design, with a first channel estimation unit using a GCE-BEM channel model with a first, small BEM order for initial channel estimation, and a second channel estimation unit using a GCE-BEM channel model with a second BEM order that is larger than the first, small BEM order of the first channel estimation unit.

The two-stage channel estimation in the receiver also permits designing an OTFS communication frame having a low pilot overhead and thus contributing to a high spectral efficiency.

Preferably, in the initial channel estimation stage, a GCE-BEM with a small BEM order of $Q_S$ and T=1 is considered for the sake of low pilot overhead and low complexity. As discussed further above, the received symbol y[k, l] is a superposition of a number of transmit symbols x[$k_t$, $l_t$], with $k_t \in$ [k−$Q_S$/2, k+$Q_S$/2] and $l_t \in$ [l−L, l].

Figure 3:
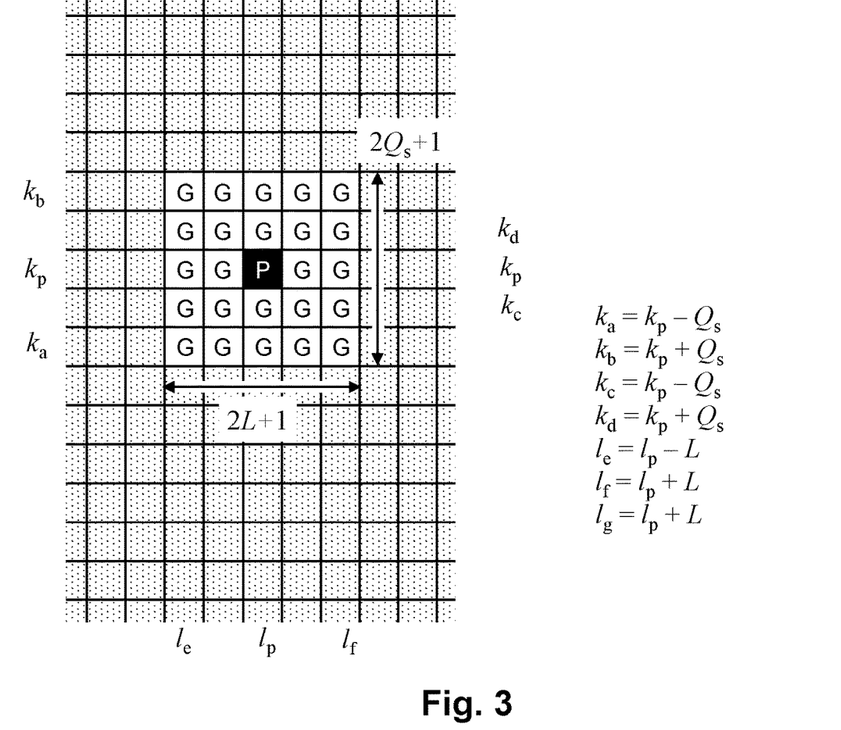
FIG. 3 depicts the OTFS frame pattern according to an aspect of the present invention at the transmitter.

FIG. 3 depicts the OTFS frame patterns according to an aspect of the present invention at the transmitter and at the receiver, respectively. At the transmitter, one pilot P is placed at ($k_p$, $l_p$), which is surrounded by 2L and 2$Q_S$ guard symbols G along delay and Doppler dimensions, respectively, so as to prevent the interference between data symbols and pilot symbol P (data symbols occupying all other grid spaces are not specifically designated in the figure). Hence, x[k, l] can attain the following values $$x[k, l] = \begin{cases} x_p, & k = k_p, l = l_p \\ 0, & k \in [k_a, k_b], l \in [l_e, l_f] \\ x_d[k, l], & \text{otherwise} \end{cases}$$

where $x_p$ and $x_d$[k, l] respectively correspond to the pilot symbol and data symbols, $k_a = k_p - Q_S$, $k_b = k_p + Q_S$, $l_e = l_p - L$ and $l_f = l_p + L$. By modelling the doubly selective fading channel using GCE-BEM, the pilot $x_p$ would be located at k∈ [$k_p$−$Q_S$/2, $k_p$+$Q_S$/2] and l∈ [$l_p$, $l_p$+L] at the receiver.

Figure 4:
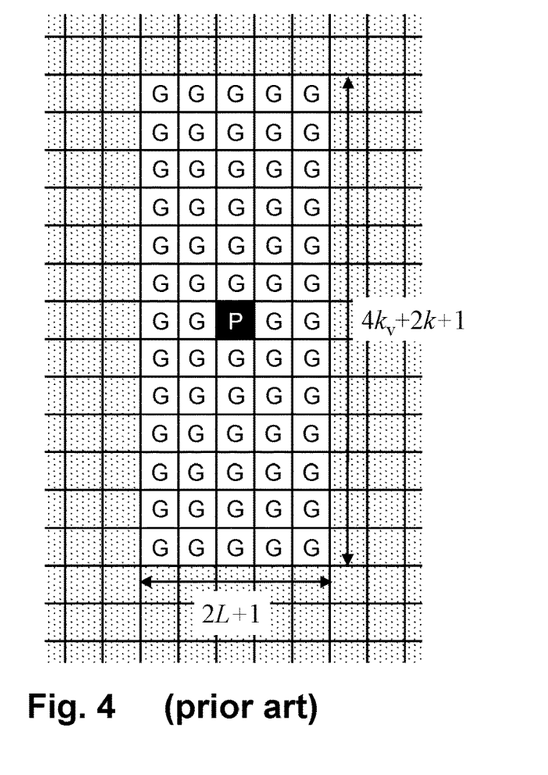
FIG. 4 shows a conventional OTFS frame pattern.

In contrast, a conventional OTFS frame design shown in FIG. 4, e.g., as suggested by P. Raviteja, K. T. Phan, and Y. Hong in "Embedded pilot-aided channel estimation for OTFS in channels," *IEEE Trans. Veh. Technol.*, vol. 68, no. 5, pp. 4906-4917, 2019, requires significantly more guard symbols G along the Doppler dimension to mitigate inter-Doppler interference, thus having a much higher pilot overhead.

Note that the guard symbols are also considered as one kind of pilot symbols, and thus the pilot overhead of the BEM OTFS receiver according to an aspect of the invention can be determined as $$\lambda = \frac{(2Q_S + 1)(2L + 1)}{MN}$$

Thus, in accordance with a first aspect of the present invention, a two-dimensional arrangement of pilot symbols and data symbols of a communication frame for an OTFS transmission system is presented. The pilot symbols and the data symbols are arranged along the points of a grid in the delay-Doppler domain. The two-dimensional arrangement is characterized by the pilot symbols being surrounded in each direction of the Doppler domain by a number of guard symbols that is twice the order of the BEM basis functions used for modelling the communication channel in a receiver in a first channel estimation unit. The two-dimensional arrangement thus represents a specific data structure of the communication frame that is the basis for a specific processing in a transmitter and, ultimately, in a receiver.

Using a low-order BEM basis function in the first channel estimation unit of the receiver results in a small pilot overhead in the communication frame, the pilot overhead including the pilot signals and the guard spaces surrounding the pilot signals. However, low-order BEM channel estimation may provide sub-par performance. The receiver in accordance with the third aspect of the invention addresses this issue by using an iterative two-stage channel estimation design, as will be discussed further below.

In one or more embodiments of the two-dimensional arrangement of pilot symbols and data symbols of a communication frame structure for an OTFS transmission system the number of guard symbols in each direction of the delay domain is twice the maximum time delay in terms of delay bins. It is recalled that the delay largely depends from the longest path a valid signal can take from the transmitter to the receiver through one or more reflections, i.e., depends from the multipath signal having the longest path.

In accordance with a second aspect of the present invention, a transmitter of an OTFS transmission system comprises a signal mapper arranged upstream of a first transmitter-side transformation unit and a second transmitter-side transformation unit. The signal mapper is adapted to receive a binary data sequence and to output a two-dimensional arrangement of pilot symbols, guard symbols and data symbols of a communication frame in the delay-Doppler domain in accordance with the first aspect of the invention described hereinbefore. The first transmitter-side transformation unit is adapted to receive, at an input, the two-dimensional communication frame in the delay-Doppler domain that is output from the signal mapper, and to output a two-dimensional arrangement of information symbols in the time-frequency domain. The two-dimensional arrangement of information symbols in the time-frequency domain comprises and represents both, pilot and data symbols. The output of the first transmitter-side transformation unit is provided to an input of the second transmitter-side transformation unit, which is adapted to output a continuous time-domain signal representing the communication frame, for transmission over the communication channel.

In one or more embodiments the first transmitter-side transformation unit is adapted to perform a pre-coding and/or an inverse symplectic finite Fourier transform.

In one or more embodiments the second transmitter-side transformation unit is adapted to perform a Heisenberg transform or an inverse finite Fourier transform (IFFT).

In realistic scenarios, there is a constraint for the transmission power which covers both data and pilot transmission. Define $P_T$ as the total transmission power and $\alpha (\alpha \in (0, 1))$ as the data power allocation ratio. It suggests that $P_T$ and $(1-\alpha)P_T$ are used for transmitting data symbols and pilots, respectively. Typically, if more power is used for pilot transmission, i.e., $\alpha$ is small, the initial channel estimation performance would be better. However, less power would remain for data transmission, giving rise to low data signal-to-noise-ratio (SNR) and thus low reliability. Instead, the pilots allocated with less power, i.e., $\alpha$ is large, would lead to a poor initial channel estimate and signal estimate, which would not be a good starting point to implement the following refinement of channel estimation and equalization, resulting in low reliability as well. Therefore, a suitable power allocation between data and pilot is of utter importance in achieving high reliability.

More specifically, it is assumed that the data power $\alpha P_T$ is allocated evenly over all the data symbols. When it comes to the pilot symbol and guard symbols, we assume all the pilot power $(1-\alpha)P_T$ is assigned to the pilot symbol $x_p$. It is noteworthy that when the average data SNR and pilot SNR are the same, the power allocation ratio $\alpha$ is defined as $$\alpha = 1 - \frac{(2Q_s+1)(2L+1)}{MN}$$

In an exemplary OTFS communication frame with M=128, N=16, $Q_S$=2 and L=5, the power allocation ratio $\alpha$ with the equal average data and pilot SNR is 97.3%. Simulations have shown that the BER for a receiver in accordance with an aspect of the present invention with a pilot overhead of $\lambda$=2.7% drops with increasing a, reaches a lowest point near an a of 0.99 and rises rapidly above that value.

In simulations, any power allocation ratio between 0.9 and 0.99 was found providing very satisfactory BER performance in the receiver according to an aspect of the present invention, while power allocation ratios between 0.5 and 0.9 still outperform prior art receivers. The BER performance of the receiver in accordance with an aspect of the present invention closely tracks a lower bound representing a perfect channel estimation over power allocation ratios between 0.5 and 0.99.

Thus, in one or more embodiments the transmitter is arranged to assign between 50% and 99% of the total transmit power to data symbols, and the remaining transmit power to pilot symbols, preferably between 90% and 99%.

In one or more embodiments the transmitter is arranged to adapt the power assigned to data and pilot symbols, respectively, in dependence of a communication channel used, a carrier frequency used and/or a differential speed between transmitter and receiver. The adaptation may be dynamic for individual or groups of subsequent communication frames, e.g., if the communication channel, the carrier frequency and/or the differential speed between transmitter and receiver vary.

In one or more embodiments the signal mapper is arranged to adapt the pilot overhead in dependence of a communication channel used, a carrier frequency used, a maximum delay and/or a differential speed between transmitter and receiver. The adaptation may be dynamic for individual or groups of subsequent communication frames, e.g., if the communication channel, the carrier frequency and/or the differential speed between transmitter and receiver vary.

A static adaptation of the pilot overhead and/or the power allocation ratio in the transmitter may be based on an assumption that the communication channel used, the carrier frequency and/or the differential speed between transmitter and receiver is static or varies negligibly within tolerable limits. The static adaptation may also consider a worst-case scenario, e.g., a maximum expected or permitted differential speed between transmitter and receiver, a maximum expected delay or the like, while the receiver and the transmitter are communicatively connected, e.g., within radio range. The expected maximum differential speed may be provided by external input data, e.g., speed limits for mobile entities like cars or trains within a coverage area of a fixed transmitter.

A dynamic adaptation of the pilot overhead and/or the power allocation ratio in the transmitter may be based on an actual differential speed between transmitter and receiver. Such information may be provided from a receiver, e.g., a speed vector of the receiver, or on information available at the transmitter, e.g., a number of receivers that are within the range of the transmitter. In a stationary transmitter, e.g., a base station or the like, this number may correspond to the number of receivers currently or on average attached or in communicative connection with the transmitter. The dynamic adaptation may also be based on information received from a receiver such as channel status information, a bit error rate or a number of iterations of channel estimations required for decoding a previously received signal.

However, the power allocation and/or the pilot overhead may also be tweaked for special requirements. For example, in order to achieve a fast convergence performance in the receiver, the power allocation ratio $\alpha$ could be selected smaller than the one with equal data SNR and pilot SNR, and/or the BEM order of the first channel estimation unit may be larger than 1, resulting in a larger pilot overhead. Simulations have shown that a power allocation ratio around 95% is advantageous for maximising of both BER and convergence performance.

Dynamically finding a near-optimal power allocation for pilot and data signals ratio may be achieved by performing training prior to the start of an actual transmission. As was mentioned further above, an advantageous power allocation ratio may be found when the average data SNR and average pilot SNR are equal.

As has been briefly mentioned above, a receiver in accordance with a third aspect of the invention uses a two-stage channel estimation implementing an initial channel estimation followed by an initial equalization and symbol estimation, and an iterative channel estimation followed by respective equalization and symbol estimation.

In an exemplary initial stage, a GCE-BEM model with a small BEM order $Q_S$ and T=1 is used for characterizing the time varying channel, for the sake of low pilot overhead and low complexity.

The element-wise input-output relation is given by $$y[k, l] = \sum_{q=0}^{Q}\sum_{l'=0}^{L} c_q[l']x[k-q', l-l']e^{j2\pi\frac{q'l}{MN}}.$$

Considering the OTFS frame in FIG. 3, the BEM coefficients $c_q[l']$ with q=0, 1, ..., $Q_S$ and l'=0, 1, ..., L can be estimated easily by the pilot $x_p$, yielding $$\hat{c}_q^0[l'] = \frac{y[k, l]}{x_p}e^{-j2\pi\frac{q'l}{MN}}, k = k_p + q', l = l_p + l',$$

where q'=q−[$Q_S$/2]. Note that the superscript $^0$ indicates that this is the initial estimate. The BEM coefficients estimate $\hat{c}_q^0[l']$ can be used for populating the BEM coefficient circulant matrix $C_q$, and thus the first estimation of the time-domain channel matrix $H_t$ can be estimated by $$\hat{H}_t^0 = \sum_{q=0}^{Q}\text{diag}\{b_q\}\hat{C}_q^0,$$

and the first estimation of the received signal vector y can be expressed as $$y = \underbrace{(F_N \otimes I_M)\hat{H}_t^0(F_N^H \otimes I_M)}_{G}x + w.$$

Finally, initial signal detection and symbol estimation can be performed, e.g., in a message passing (MP) equalizer, with the estimated symbols $\hat{x}^0$ comprising both pilots and data symbols.

In an exemplary iterative stage, the channel estimation is refined in two ways. On the one hand, the more accurate GCE-BEM model with a larger BEM order and T=2 is adopted, for accurately characterizing the doubly selective fading channel. On the other hand, the data symbols detected in a previous channel estimation are utilized as pseudo pilots to refine the channel estimation. The refined channel estimate, in turn, leads to an enhanced equalization. The aforementioned refined channel estimation and equalization are repeated iteratively until a termination criterion is reached, e.g., a predetermined number of iterations or an improvement over the previous equalization that lies below a predetermined value.

Define s=$(F_N^H \otimes I_M)$x and denote s=[s[0], s[1], ..., s[MN−1]]$^T$. Since the BEM coefficients matrix $C_q$ is circulant, $C_q$s=S$c_q$ could be obtained, where S is defined as $$S = \begin{bmatrix} s[0] & s[MN-1] & \cdots & s[MN-L] \\ s[1] & s[0] & \cdots & s[MN-L+1] \\ \vdots & \vdots & \ddots & \vdots \\ s[MN-1] & s[MN-2] & \cdots & s[MN-L-1] \end{bmatrix}.$$

By exploiting the DFT concept, S can be written as $$S = F_{MN}^H \text{diag}\{F_{MN}s\}F_{MN \times L},$$

and the received signal vector y can be determined as $$y = \sum_{q=0}^{Q}(F_N \otimes I_M)\text{diag}\{b_q\}F_{MN}^H\text{diag}\{F_{MN}(F_N^H \otimes I_M)x\}F_{MN \times L}c_q + w.$$

For the iterative channel estimation, the GCE-BEM with a BEM order $Q_L$ larger than the BEM order $Q_S$ of the initial channel estimation is used, and T is larger than that of the initial channel estimation, e.g., T=2. It is recalled that larger values for T improve the BEM resolution, while the BEM order Q is increased accordingly, i.e., Q=2 [TN$f_{max}$]. Consequently, the BEM modelling error can be reduced and the channel estimation performance can be enhanced, at the cost of an increased complexity. A good trade-off between estimation accuracy and computational complexity has been found for T=2, while other values are not excluded and may also depend from the BEM variant used or other factors.

Define c=[$c_0^T$, $c_1^T$, ..., $c_{Q_L}^T$]$^T$. With the signal estimate $\hat{x}^{(i)}$ the l-th iteration, the BEM coefficient vector c can be easily obtained as $$\hat{c}^{i+1} = (\hat{A}^i)^{\dagger}y,$$

where $\hat{A}^i = \left[\hat{A}_0^i, \hat{A}_1^i, ..., \hat{A}_q^i\right]$, with $$\hat{A}_q^i = (F_N \otimes I_M)\text{diag}\{b_q\}F_{MN}^H\text{diag}\{F_{MN}(F_N^H \otimes I_M)\hat{x}^i\}F_{MN \times L}.$$

A new channel and signal estimate are then determined and denoted as $\hat{H}_t^{i+1}$ and $\hat{x}^{i+1}$, respectively. The above procedures, namely channel estimation and equalization, are repeated until a termination criterion is met, e.g., a satisfactory performance is obtained.

Accordingly, in accordance with the third aspect of the present invention, a receiver for an OTFS transmission system comprises a first receiver-side transformation unit and a second receiver-side transformation unit. The receiver is adapted to receive a time-domain signal representing a communication frame in accordance with claim 1 transmitted over a practical communication channel, i.e., a communication channel subject to Doppler spread, at an input of the first receiver-side transformation unit, which outputs a two-dimensional representation of the received communication frame in the time-frequency domain. The output of the first receiver-side transformation unit is provided to an input of the second receiver-side transformation unit, which outputs a two-dimensional representation of the received communication frame comprising pilot and data signals in the delay-Doppler domain. At least the pilot signals output from the second receiver-side transformation unit are provided to a first channel estimation unit, which outputs a first estimation of the time-domain channel matrix $\hat{H}_t^{i=0}$. The first estimation of the time-domain channel matrix $\hat{H}_t^{i=0}$, as well as at least the data signals output from the second receiver-side transformation unit or the pilot and data signals output from the second receiver-side transformation unit, are provided to an equalizer unit, which outputs an estimated set of at least data signals. The estimated set of at least data signals, as well as at least the pilot signals output from the second receiver-side transformation unit or the pilot and data signals output from the second receiver-side transformation unit, are provided to a second channel estimation unit, which outputs a second estimation of the time-domain channel matrix $\hat{H}_t^{i\geq 1}$. The output $\hat{H}_t^{i\geq 1}$ of the second channel estimation unit, as well as at least the data signals output from the second receiver-side transformation unit or the pilot and data signals output from the second receiver-side transformation unit, are provided to the equalizer unit, which outputs a further estimated set of at least data signals. The channel estimation in the second channel estimation unit and estimating an estimated set of at least data signals in the equalizer unit is iteratively repeated until a termination criterion is met. In other words, the process of estimating the time-domain channel matrix $\hat{H}_t^i$ in the second channel estimation unit and estimating sets of at least data symbols in the equalizer unit, feeding back the respective latest output from the equalizer unit, as well as at least the pilot signals output from second receiver-side transformation unit or the pilot and data signals output from the second receiver-side transformation unit, to the second receiver-side channel estimation unit, are repeated until the termination criterion is met.

Termination criteria may include convergence of the outputs of the equalizer unit. Such convergence may be assumed, e.g., when the bit error rate of the decoded output of the equalizer unit for two subsequent iterations is below a predetermined threshold. The threshold may be, e.g., a difference in bit error rates that is smaller than $10^{-6}$. Another conceivable termination criterion may be a predetermined number of iterations. It is also possible to set a maximum number of iterations after which the iteration is terminated, but to terminate the iteration earlier when the bit error rate for two subsequent iterations lies below the predetermined threshold before the maximum number of iterations is reached.

In one or more embodiments of the receiver the first receiver-side transformation unit is adapted to perform a finite Fourier transform, an inverse Heisenberg-, or Wigner-transform.

In one or more embodiments of the receiver the second receiver-side transformation unit is adapted to perform a symplectic finite Fourier transform.

In one or more embodiments of the receiver the first channel estimation unit is adapted to perform a channel estimation based on a basis expansion modelling of a first BEM order of the time-varying communication channel. The first BEM order refers to the order of basis expansion for modelling the communication channel. The first channel estimation preferably is a pilot-aided channel estimation, i.e., uses the known locations and/or other properties of the pilot signals in the communication frame for estimating.

In one or more embodiments of the receiver the equalizer performs a message passing, a zero-forcing and/or a minimum mean square error equalization.

In one or more embodiments of the receiver the second channel estimation unit is adapted to perform a channel estimation based on a basis expansion modelling of a second BEM order of the time-varying communication channel. The second BEM order refers to the order of basis expansion for modelling the communication channel. The second channel estimation preferably is a data-aided channel estimation, i.e., uses the signals estimated in the equalizer unit in addition to the pilot signals in the communication frame for estimating. Preferably, the second BEM order is larger than the first BEM order, e.g., the first BEM order $Q_S$ may be 2, and the second BEM order $Q_L$ may be 4 or 6.

One or more embodiments of the receiver further comprise a control unit that is adapted to receive information about the absolute speed and direction of the receiver over ground, the absolute speed and direction of the transmitter over ground and/or the relative speed between the receiver and the transmitter, and is further adapted to determine a BEM order $Q_S$, and/or is adapted to receive the BEM order $Q_S$ used at the transmitter for composing the communication frame. The received or determined BEM order $Q_S$ and/or the received information is passed to the first and/or second channel estimation unit, for determining the respective order of BEM to be applied or used. Information about the BEM order $Q_S$ used at the transmitter may be transmitted, e.g., when a mobile terminal attaches to a base station, or more generally, when a communication connection between a transmitter and a receiver is established. As only a few bytes are needed this would not significantly reduce the overhead, but may actually increase the spectral efficiency in case a smaller overhead than a default overhead can be used.

If no dynamic adaptation of the BEM order $Q_S$ is used, the receiver may assume a stipulated default value.

As mentioned further above, using a low-resolution GCE-BEM with a small BEM order $Q_S$ in the first channel estimation unit of the receiver results in a small pilot overhead in the communication frame. The resulting sub-par channel estimation performance is more than compensated for by iteratively providing the data signals estimated after each channel estimation to a second channel estimation unit of the receiver using a high-resolution GCE-BEM with a BEM order $Q_L$ that is larger than that used in the first channel estimation unit of the receiver. In the second channel estimation unit the estimated data signals serve as pseudo pilot signals and permit a channel estimation that is greatly improved with each subsequent iteration, as more and more pseudo pilot signals become available.

The various elements of the transmitter and the receiver presented above may be implemented in hardware, as software modules, or combinations thereof, i.e., hardware that is controlled and/or parameterized through software. In particular, the first and second channel estimation units of the receiver may rely on the same hardware or software module, and may be parameterized for the respective pilot-aided or data-aided channel estimation, using respective input data and GCE-BEM parameters.

A wireless device in accordance with a third aspect of the present invention comprises a transmitter and/or a receiver for an OTFS transmission system as described hereinbefore.

In accordance with a fourth aspect of the present invention, a method of transmitting a binary data sequence over an OTFS communication channel comprises mapping, in a signal mapper, a binary data sequence into a two-dimensional arrangement of pilot symbols and data symbols along the points of a grid in the delay doppler domain. In the two-dimensional arrangement according to an aspect of the invention the number of guard symbols surrounding the pilot symbol in each direction of the Doppler domain is twice the number of the BEM basis functions used for modelling the communication channel in a receiver. The converter may provide a number of guard symbols around the pilot symbol in each direction of the delay domain that is twice the maximum time delay in terms of delay bins. The two-dimensional arrangement forms a communication frame for an OTFS transmission system. Converting may include receiving the binary data sequence at an input of the signal mapper and providing the two-dimensional arrangement of pilot and data symbols at an output of the signal mapper.

The method further comprises transforming, in a first transmitter-side transformation unit, the two-dimensional communication frame in the delay-Doppler domain into a two-dimensional arrangement of information symbols in the time-frequency domain. The first transformation may include receiving the two-dimensional communication frame in the delay-Doppler domain at an input of the first transmitter-side transformation unit and providing the two-dimensional arrangement of information symbols at an output of the first transmitter-side transformation unit.

The method yet further comprises transforming, in a second transmitter-side transformation unit, the two-dimensional arrangement of information symbols into a continuous time-domain signal representing the communication frame. The second transformation may include receiving the two-dimensional arrangement of information symbols in the time-frequency domain at an input of the second transmitter-side transformation unit and providing the continuous time-domain signal representing the communication frame at an output of the second transmitter-side transformation unit.

The method further comprises transmitting the continuous time-domain signal representing the communication frame over the communication channel. Transmitting may include steps known from conventional transmitters such as amplifying, beam-forming and -directing and the like.

In one or more embodiments of the method, the first transforming step comprises subjecting the two-dimensional communication frame in the delay-Doppler domain to an inverse symplectic finite Fourier transform.

In one or more embodiments of the method, the second transforming step comprises subjecting the two-dimensional arrangement of information symbols to a Heisenberg transform or an inverse finite Fourier transform (IFFT).

In one or more embodiments the method further comprises setting a power allocation ratio between data and pilot symbols between 0.5 and 0.99, preferably between 0.9 and 0.99.

In one or more embodiments the method further comprises adapting a power allocation ratio between data and pilot symbols in dependence of a communication channel used, a carrier frequency used and/or a differential speed between transmitter and receiver.

In one or more embodiments the method further comprises adapting the pilot overhead in dependence of a communication channel used, a carrier frequency used and/or a differential speed between transmitter and receiver.

In accordance with a fifth aspect of the present invention, a method of receiving a binary data sequence over a practical OTFS communication channel comprises receiving a continuous time-domain signal representing a communication frame in accordance with claim 1 or 2 over the communication channel. The method further comprises transforming, in a first receiver-side transformation unit, the continuous time-domain signal representing the communication frame into a two-dimensional arrangement of information symbols in the time-frequency domain that is available at an output of the first receiver-side transformation unit. In a next step of the method the two-dimensional arrangement of information symbols comprising pilot and data signals in the time-frequency domain is transformed, in a second receiver-side transformation unit, into a two-dimensional communication frame comprising pilot and data signals in the delay-Doppler domain, which is made available at an output of the second receiver-side transformation unit. For obtaining a first estimation of the time-domain channel matrix $\hat{H}_t^{i=0}$ at an output of a first channel estimation unit at least the pilot signals comprised in the two-dimensional communication frame in the delay-Doppler domain are provided to a first channel estimation unit. The first estimation of the time-domain channel matrix $\hat{H}_t^{i=0}$, as well as at least the data signals output from the second receiver-side transformation unit or the pilot and data signals output from the second receiver-side transformation unit, are then provided to an equalizer unit, for obtaining an estimated set of at least data signals at an output of the equalizer unit. Next, the estimated set of at least data signals that are output from the equalizer unit, as well as at least the pilot signals available after the second transformation in the second receiver-side transformation unit or the pilot and data signals output from the second receiver-side transformation unit, are provided to a second channel estimation unit, for estimating a further estimation of the time-domain channel matrix $\hat{H}_t^{i\geq1}$. The further estimation of the time-domain channel matrix $\hat{H}_t^{i\geq1}$ available at an output of the second channel estimation unit, as well as at least the data signals obtained after the second transformation in the second receiver-side transformation unit or the pilot and data signals output from the second receiver-side transformation unit, are then provided to the equalizer unit, for obtaining a further estimated set of at least data signals. Estimating the time-domain channel matrix $\hat{H}_t^{i\geq1}$ in the second channel estimation unit and estimating sets of at least data signals in the equalizer unit is iteratively repeated until a termination criterion is met. In the iterative repetition, the respective latest further estimated set of at least data signals and the pilot signals are used for estimating the time-domain channel matrix $\hat{H}_t^{i\geq1}$ and the respective latest estimated time-domain channel matrix $\hat{H}_t^{i\geq1}$, as well as at least the data signals obtained after the second transformation in the second receiver-side transformation unit or the pilot and data signals output from the second receiver-side transformation unit, are used for the next estimation of at least data signals.

In one or more embodiments of the method, transforming the continuous time-domain signal representing the communication frame into a two-dimensional arrangement of information symbols in the time-frequency domain comprises subjecting the continuous time-domain signal representing a communication frame to a finite Fourier transform, an inverse Heisenberg-, or Wigner-transform.

In one or more embodiments of the method, transforming the two-dimensional arrangement of information symbols comprising pilot and data signals in the time-frequency domain into a two-dimensional communication frame comprising pilot signals and data signals in the delay-Doppler domain comprises subjecting the two-dimensional arrangement of information symbols comprising pilot and data signals in the time-frequency domain to a symplectic finite Fourier transform.

In one or more embodiments of the method, obtaining the first estimation of the time-domain channel matrix $\hat{H}_t^{i=0}$ comprises performing a channel estimation based on a basis expansion modelling of the time-varying communication channel of a first BEM order.

In one or more embodiments of the method, estimations of the time-domain channel matrix $\hat{H}_t^{i\geq 1}$ in the second channel estimation unit comprises performing a channel estimation based on a basis expansion modelling of the time-varying communication channel of a second BEM order. Preferably, the second BEM order is larger than the first BEM order.

In one or more embodiments of the method, obtaining an estimated set of at least data signals in the equalizer unit comprises subjecting at least the data signals obtained after the second transformation in the second receiver-side transformation unit to a message passing, a zero-forcing and/or a minimum mean square error equalization.

In one or more embodiments the method further comprises receiving, in a control unit, information about the absolute speed and direction of the receiver over ground, the absolute speed and direction of the transmitter over ground and/or the relative speed between the receiver and the transmitter, and determining a BEM order $Q_S$, and/or receiving the BEM order $Q_S$ used at the transmitter for composing the communication frame. The received information may be used for determining the respective BEM order to be used in the first and/or in the second channel estimation unit. The respective received or determined BEM order is provided to the first and/or to the second channel estimation unit.

The methods of transmitting and/or receiving may be represented by computer program instructions which, when executed by a microprocessor, cause the computer and/or control hardware components of a transmitter or a receiver of an OFTS transmission system as presented hereinbefore, respectively, to execute the method of transmitting or receiving as presented hereinbefore, respectively.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

BRIEF DESCRIPTION OF THE DRAWING

In the following section exemplary embodiments of the invention will be described in greater detail with reference to the drawing. In the drawing.

Throughout the figures identical or similar elements may be referenced using the same reference designators.

DETAILED DESCRIPTION OF THE PREFERRED EMBODIMENTS

FIGS. 1 to 4 have been described further above and will not be discussed again.

Figure 5:
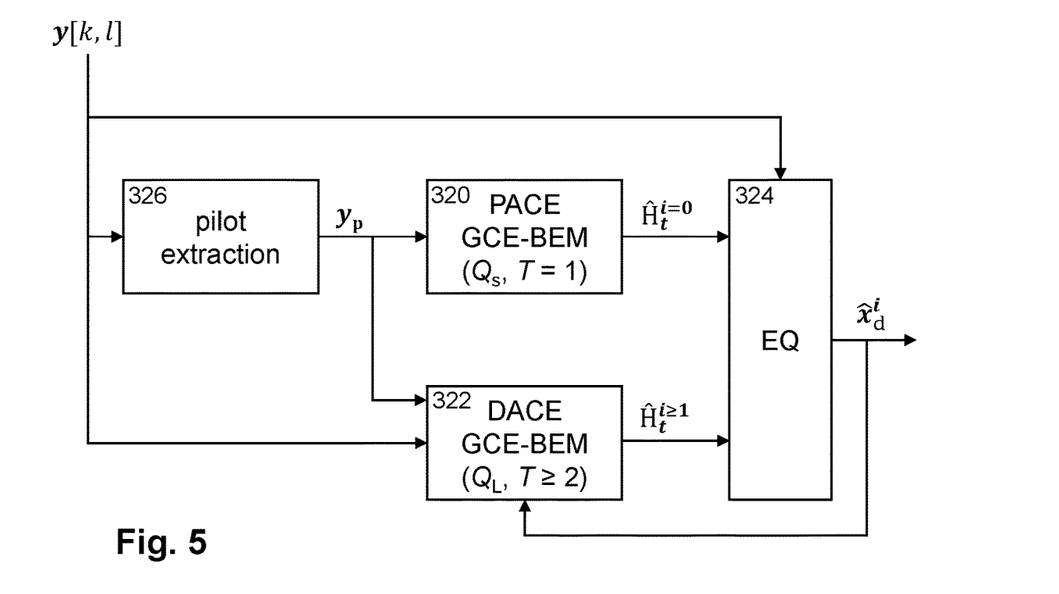
FIG. 5 shows a block diagram of channel estimation and equalization of an exemplary receiver in accordance with an aspect of the present invention.

FIG. 5 shows a block diagram of channel estimation and equalization of an exemplary receiver in accordance with an aspect of the present invention. The channel estimation and equalization replace the generic channel estimation and equalization block shown in FIG. 1. All other elements of the receiver 300 shown in FIG. 1, i.e., first and second receiver-side transformation units 304 and 306, respectively, are identical and are not shown in the figure.

The two-dimensional arrangement of pilot and data signals y[k, l] in the delay-Doppler domain output from the second receiver-side transformation unit 306 may first be provided to a pilot extraction unit 326, which is essentially a windowing function that uses the knowledge of the construction of the transmitted two-dimensional array for removing or suppressing data signals. The extracted pilot signals $y_p$ are provided to a first channel estimation unit 320, which performs a pilot-aided first channel estimation using a GCE-BEM channel model with a small BEM order $Q_S$ and a low-resolution T. The result of the channel estimation in the first channel estimation unit 320 is provided to an equalizer 324, together with at least the received data signals $y_d$ available at the second receiver-side transformation unit 306 or the entire received two-dimensional arrangement of pilot and data signals y[k, l]. The first estimation of the transmitted symbols is fed back to a second channel estimation unit 322, which outputs a data-aided channel estimation using a GCE-BEM channel model with a higher BEM order $Q_L$ and a higher resolution T than the first channel estimation unit. The second channel estimation unit 322 also receives the extracted pilot signals $y_p$ or the entire received two-dimensional arrangement of pilot and data signals y[k, l]. The result of the channel estimation in the second channel estimation unit 322 is provided to equalizer 324, together with at least the received data signals $y_d$ available at the second receiver-side transformation unit 306 or the entire received two-dimensional arrangement of pilot and data signals y[k, l], for obtaining an estimation of the transmitted symbols that is improved over the previous one. The process is repeated until the termination criterion is fulfilled.

Figure 6:
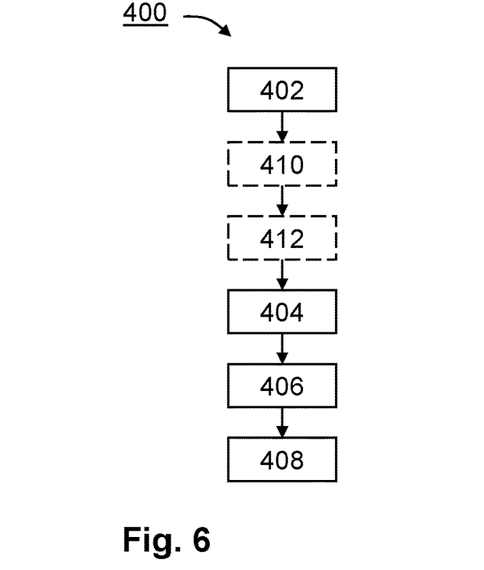
FIG. 6 shows a flow diagram of a method of transmitting a binary data sequence over an OTFS communication channel.

FIG. 6 shows a flow diagram of a method 400 of transmitting a binary data sequence over an OTFS communication channel. In step 402 a binary data sequence is mapped into a two-dimensional communication frame in the delay-Doppler domain. In step 404 the two-dimensional communication frame in the delay-Doppler domain is transformed into a two-dimensional arrangement of information symbols in the time-frequency domain. In step 406 the two-dimensional arrangement of information symbols in the time-frequency domain is transformed into a continuous time-domain signal representing the communication frame, which is transmitted over the channel in step 408. Prior to transforming the two-dimensional arrangement of information symbols in the delay-Doppler domain into a two-dimensional arrangement of information symbols in the time-frequency domain a power allocation ratio between pilot and data signals and/or a pilot overhead may be determined or adapted in optional step 410, which is set in optional step 412.

Figure 7:
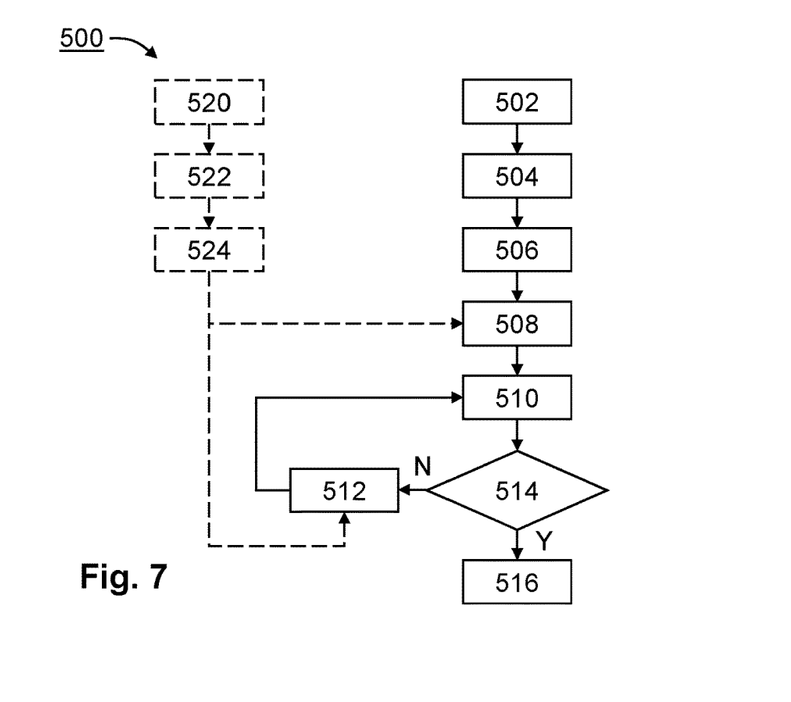
FIG. 7 shows a flow diagram of a method of receiving a binary data sequence over an OTFS communication channel susceptive to doubly-selective fading.

FIG. 7 shows a flow diagram of a method 500 of receiving a binary data sequence over an OTFS communication channel susceptive to doubly-selective fading. In step 502 a continuous time-domain signal representing a communication frame is received over the communication channel. In step 504 the continuous time-domain signal representing the communication frame is transformed into a two-dimensional arrangement of information symbols in the time-frequency domain. In step 506 the two-dimensional arrangement of information symbols comprising pilot and data signals in the time-frequency domain is transformed into a two-dimensional communication frame comprising pilot signals and data signals in the delay-Doppler domain. In step 508 an initial estimation of a time-domain channel matrix is obtained in a first channel estimation unit 320 that performs a channel estimation based on a basis expansion modelling of the time-varying communication channel of a first BEM order and at a first, low resolution. In step 510 an estimated set of at least data signals is determined in an equalizer unit 324, based on the channel estimation and the communication frame in the delay-Doppler domain. Step 514 checks if a termination criterion is met, which in the positive case, "Yes"-branch of step 514, signals that the estimated received symbols can be output to a de-mapper, in step 516, and ultimately can be output as a received binary sequence. If the termination criterion is not met, "No"-branch of step 514, a further estimation of a time-domain channel matrix is obtained in a second channel estimation unit 322 that performs a channel estimation based on a basis expansion modelling of the time-varying communication channel of a second BEM order and at a second, higher resolution, using the estimated data signals in addition to the pilot signals. The result of the channel estimation is provided to the equalizer, which repeats step 510 using the further estimation from step 512.

Optionally, in step 520, a BEM order $Q_S$ that was used in the transmitter may be received, or information permitting determining a BEM order to be used in the channel estimation. In step 522 the BEM order $Q_S$ to be used is determined, and provided to the channel estimation unit is step 524.

DEFINITIONS AND LIST OF REFERENCE
NUMERALS (PART OF THE DESCRIPTION)

$f_c$ carrier frequency
$\Delta f$ subcarrier spacing
L channel length
M number of delay bins
N number of Doppler bins
$P_T$ total transmission power
$\alpha$ data power allocation ratio
$\lambda$ pilot overhead
$Q_S$ BEM order in the initial, low-order channel estimation
$Q_L$ BEM order in the subsequent, iterative channel estimation
AWGN additive white Gaussian noise
BEM basis expansion model
CE-BEM complex exponential BEM
GCE-BEM generalized CE-BEM
DFT discrete Fourier transform
MSE mean square error
OTFS orthogonal time frequency space
SNR signal-to-noise-ratio
BER bit error rate
OFDM orthogonal frequency division multiplexing
MP message passing
SFFT finite symplectic Fourier transform
200 transmitter
202 first transmitter-side transformation unit
204 second transmitter-side transformation unit
206 antenna
300 receiver
302 antenna
304 first receiver-side transformation unit
306 second receiver-side transformation unit
310 channel estimation and equalization block
320 first channel estimation unit
322 second channel estimation unit
324 equalizer unit
326 pilot extraction unit
400 method of transmitting
402 mapping to delay-Doppler domain
404 transform to time-frequency domain
406 transform to continuous time-domain signal
408 transmit over channel
410 adapting power allocation/pilot overhead
412 setting power allocation/pilot overhead
500 method of receiving
502 receiving continuous time-domain signal
504 transforming continuous time-domain signal into a two-dimensional arrangement of information symbols in the time-frequency domain
506 transforming a two-dimensional arrangement of information symbols in the time-frequency domain into a two-dimensional communication frame in the delay-Doppler domain
508 estimating time-domain channel matrix in a first channel estimation unit
510 obtaining estimating symbols
512 estimating time-domain channel matrix in a second channel estimation unit
514 termination criterion met?
516 output estimation to de-mapper
520 receiving
522 determining BEM to be used
524 providing BEM to channel estimation unit

The invention claimed is:

1. A two-dimensional arrangement of pilot symbols and data symbols of a communication frame for an Orthogonal Time Frequency Space (OTFS) transmission system, the pilot symbols and data symbols being arranged along points of a grid in a delay-Doppler domain, wherein the pilot symbols are surrounded by guard symbols, wherein the number of guard symbols in each direction of the delay-Doppler domain is twice an order of a basis expansion model (BEM) basis functions used for modelling a communication channel in a receiver.

2. The two-dimensional arrangement of symbols in the communication frame for an OTFS transmission system of claim 1, wherein the number of guard symbols surrounding the pilot symbol in each direction of the delay-Doppler domain is twice a maximum time delay in terms of delay bins.

3. A transmitter of an OTFS transmission system comprising a signal mapper arranged upstream of a first transmitter-side transformation unit and a second transmitter-side transformation unit,
wherein the signal mapper is adapted to receive a binary data sequence and to output a two-dimensional communication frame (x[k, l]) in the delay-Doppler domain in which pilot symbols, data symbols and guard symbols are two-dimensionally arranged in accordance with claim 1, wherein the first transmitter-side transformation unit is adapted to receive, at an input, the two-dimensional communication frame in the delay-Doppler domain that is output from the signal mapper, and to output a two-dimensional arrangement of information symbols in a time-frequency domain, and wherein the output of the first transmitter-side transformation unit is provided to an input of the second transmitter-side transformation unit, which is adapted to output a continuous time-domain signal representing the communication frame, for transmission over the communication channel.

4. The transmitter for an OTFS transmission system according to claim 3, wherein the transmitter is arranged to assign between 50% and 99% of a total transmit power to data symbols, and a remaining transmit power to pilot symbols, preferably between 90% and 99%.

5. The transmitter for an OTFS transmission system according to claim 3, wherein the transmitter is arranged to adapt a power assigned to data and pilot symbols, respectively, in dependence of a communication channel used, a carrier frequency used and/or a differential speed between the transmitter and the receiver.

6. The transmitter for an OTFS transmission system according to claim 3, wherein the signal mapper is arranged to adapt the pilot overhead in dependence of a communication channel used, a carrier frequency used and/or a differential speed between the transmitter and the receiver.

7. The receiver for an OTFS transmission system comprising a first receiver-side transformation unit and a second receiver-side transformation unit, wherein the receiver is adapted to receive a time-domain signal representing a communication frame in accordance with claim 1 transmitted over a communication channel at an input of the first receiver-side transformation unit, which outputs a two-dimensional representation of the received communication frame in a time-frequency domain, and wherein the output of the first receiver-side transformation unit is provided to an input of the second receiver-side transformation unit, which outputs a two-dimensional representation of the received communication frame comprising pilot and data signals in the delay-Doppler domain, wherein at least the pilot signals output from the second receiver-side transformation unit are provided to a first channel estimation unit, which outputs a first estimation of a time-domain channel matrix ($\hat{H}_t^{i=0}$), wherein the first estimation of the time-domain channel matrix ($\hat{H}_t^{i=0}$), as well as at least the data signals output from the second receiver-side transformation unit or the pilot and data signals output from the second receiver-side transformation unit, are provided to an equalizer unit, which outputs an estimated set of at least data signals, wherein the estimated set of at least data signals, as well as at least the pilot signals output from the second receiver-side transformation unit or the pilot and data signals output from the second receiver-side transformation unit, are provided to a second channel estimation unit, which outputs a second estimation of the time-domain channel matrix ($\hat{H}_t^{i\geq 1}$), wherein the output ($\hat{H}_t^{i\geq 1}$) of the second channel estimation unit, as well as at least the data signals output from the second receiver-side transformation unit or the pilot and data signals output from the second receiver-side transformation unit, are provided to the equalizer unit, which outputs a further estimated set of at least data signals, wherein the receiver is adapted to iteratively repeat the channel estimation in the second channel estimation unit and estimating an estimated set of at least data signals in the equalizer unit until a termination criterion is met.

8. The receiver for an OTFS transmission system according to claim 7, wherein the first channel estimation unit is adapted to perform a channel estimation based on a basis expansion modelling of a first BEM order of a time-varying communication channel.

9. The receiver for an OTFS transmission system according to claim 7, wherein the equalizer unit performs a message passing, a zero-forcing and/or a minimum mean square error equalization.

10. The receiver for an OTFS transmission system according to claim 7, wherein the second channel estimation unit is adapted to perform a channel estimation based on a basis expansion modelling of a second BEM order of a time-varying communication channel.

11. The receiver for an OTFS transmission system according to claim 7, further comprising a control unit that is adapted to receive information about an absolute speed and direction of the receiver over ground, an absolute speed and direction of a transmitter over ground and/or a relative speed between the receiver (300) and the transmitter, and is further adapted to determine a BEM order ($Q_S$), and/or is adapted to receive the BEM order ($Q_S$) used at the transmitter for composing the communication frame, and is adapted to pass the received information and/or the BEM order ($Q_S$) to the first and/or second channel estimation unit.

12. A method of transmitting a binary data sequence over an OTFS communication channel, comprising:
mapping, in a signal mapper, a binary data sequence into a two-dimensional communication frame in the delay-Doppler domain in accordance with claim 1,
transforming, in a first transmitter-side transformation unit, the two-dimensional communication frame in the delay-Doppler domain into a two-dimensional arrangement of information symbols in a time-frequency domain,
transforming, in a second transmitter-side transformation unit, the two-dimensional arrangement of information symbols in the time-frequency domain into a continuous time-domain signal representing the communication frame, and
transmitting the continuous time-domain signal representing the communication frame over the communication channel.

13. The method of claim 12, further comprising setting a power allocation ratio between data and pilot symbols between 0.5 and 0.99, preferably between 0.9 and 0.99.

14. The method of claim 12, further comprising adapting a power allocation ratio between data and pilot symbols in dependence of a communication channel used, a carrier frequency used and/or a differential speed between i) at least one of the first transmitter-side and the second transmitter side, and ii) the receiver.

15. The method of claim 12, further comprising adapting the pilot overhead in dependence of a communication channel used, a carrier frequency used and/or a differential speed between i) at least one of the first transmitter-side and the second transmitter side, and ii) the receiver.

16. A method of receiving a binary data sequence over an OTFS communication channel susceptive to doubly-selective fading, comprising:
receiving a continuous time-domain signal representing a communication frame in accordance with claim 1 over the communication channel,
transforming, in a first receiver-side transformation unit, the continuous time-domain signal representing the communication frame into a two-dimensional arrangement of information symbols in a time-frequency domain that is available at an output of the first receiver-side transformation unit, transforming, in a second receiver-side transformation unit, the two-dimensional arrangement of information symbols comprising pilot and data signals in the time-frequency domain into a two-dimensional communication frame comprising pilot signals and data signals in the delay-Doppler domain that is available at an output of the second receiver-side transformation unit, providing at least the pilot signals output from the second receiver-side transformation unit to a first channel estimation unit, for obtaining a first estimation of a time-domain channel matrix ($\hat{H}_t^{i=0}$) at an output of the first channel estimation unit, providing the first estimation of the time-domain channel matrix ($\hat{H}_t^{i=0}$), as well as at least the data signals output from the second receiver-side transformation unit (306) or the pilot and data signals output from the second receiver-side transformation unit (306), to an equalizer unit, for obtaining an estimated set of at least data signals at an output of the equalizer unit, estimating, in a second channel estimation unit, an estimation of the time-domain channel matrix ($\hat{H}_t^{i\geq 1}$), from the estimated set of at least data signals that are output from the equalizer unit, as well as from at least the pilot signals obtained after the second transformation in the second receiver-side transformation unit or the pilot and data signals output from the second receiver-side transformation unit, providing the estimation of the time-domain channel matrix ($\hat{H}_t^{i\geq 1}$) available at an output of the second channel estimation unit, as well as at least the data signals obtained after the second transformation in the second receiver-side transformation unit or the pilot and data signals output from the second receiver-side transformation unit, to the equalizer unit, for obtaining a further estimated set of at least data signals, and iteratively repeating estimating the time-domain channel matrix ($\hat{H}_t^{i\geq 1}$) in the second channel estimation unit and estimating sets of at least data signals in the equalizer unit until a termination criterion is met.

17. The method of claim 16, wherein obtaining the first estimation of the time-domain channel matrix ($\hat{H}_t^{i=0}$) in the first channel estimation unit comprises performing a channel estimation based on a basis expansion modelling of a time-varying communication channel of a first BEM order.

18. The method of claim 16, wherein obtaining estimations of the time-domain channel matrix ($\hat{H}_t^{i\geq 1}$) in the second channel estimation unit comprises performing a channel estimation based on a basis expansion modelling of a time-varying communication channel of a second BEM order.

19. The method of claim 16, wherein obtaining an estimated set of at least data signals in the equalizer unit comprises subjecting at least the data signals obtained after the second transformation in the second receiver-side transformation unit to a message passing, a zero-forcing and/or a minimum mean square error equalization.

20. The method of claim 16, further comprising:
receiving, in a control unit, information about an absolute speed and direction of the receiver over ground, an absolute speed and direction of a transmitter over ground and/or a relative speed between the receiver and the transmitter, and/or the BEM order ($Q_S$) used at the transmitter for composing the communication frame,
determining the respective BEM order to be used in the first and/or in the second channel estimation unit, and
providing the respective determined BEM order to the first and/or to the second channel estimation unit.

\* \* \* \* \*